United States Patent Office 3,314,986
Patented Apr. 18, 196

3,314,986
BENZOIC ACID ESTER OF M-(2-PRO-PYNYLOXY)PHENOL
Chester E. Pawloski, Bay City, Mich., assignor to The Dow Chemical Company, Midland, Mich., a corporation of Delaware
No Drawing. Filed Dec. 26, 1963, Ser. No. 333,756
1 Claim. (Cl. 260—476)

The present invention is directed to m-(2-propynyloxy) phenyl benzoate corresponding to the formula

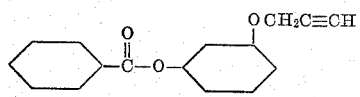

This compound is a liquid which is somewhat soluble in many organic solvents and of low solubility in water. The compound has been found to be useful as a parasiticide for the control of various insect, worm, bacterial, fungal and mite organisms such as tapeworms, roundworms, roaches and plant blight.

The compound can be prepared by reacting resorcinol monobenzoate and a propargyl halide such as propargyl bromide or propargyl chloride. The reaction is carried out in the presence of a basic material and preferably in a liquid reaction medium such as isopropanol, acetone or methyl ethyl ketone. The reaction takes place smoothly in the temperature range at which the halide of reaction is formed and preferably between the temperatures of 0 and 100° C. The halide of reaction appears in the reaction mixture as the salt of the metal cation of the employed base. The amounts of the reactants to be employed are not critical, some of the desired product being obtained when employing the reactants in any amounts. However, the reaction consumes the reactants in equimolar proportions and the use of amounts which represent such proportions is preferred. Upon completion of the reaction the desired product can be separated and purified by conventional procedures.

In carrying out the reaction the propargyl halide and the resorcinol monobenzoate and the basic material are combined in any convenient fashion, however, in a preferred method they are dispersed in an organic solvent as reaction medium. The resulting mixture is elevated to and maintained at the reaction temperature until there is a subsantial cessation in the formation of the halide reaction. The reaction mixture can then be filtered and employed in pesticidal compositions. In a preferred procedure the reaction mixture is combined with an aqueous solution of alkali metal hydroxide and the mixture heated for a short time. The reaction mixture is then washed with water. The organic layer which is obtained during the washing procedure is collected and heated to remove any low boiling constituents and obtain the desired product as a liquid residue.

In a representative operation resorcinol monobenzoate (75 grams), propargyl bromide (50 grams) and potassium carbonate (55 grams) were dispersed in 500 milliliters of acetone and the resulting mixture heated at the boiling temperature and under reflux for 24 hours. To the reaction mixture was added an aqueous solution of 2 percent sodium hydroxide and the mitxure heated for another 4 hours. At the end of the heating period the reaction mixture was washed with water and the organic layer which separated during the washing procedure was heated to remove the low boiling constituents. As a result of these operations, there was obtained the m-(2-propynyloxy)phenyl benzoate product as a liquid residue having a refractive index n/D of 1.5563 at 25° C.

The novel product of the present invention is useful as the toxic constituent in pesticidal applications for the control of the growth and killing of a number of insect, mite, worm, bacterial, plant and fungal organisms. For such uses, the product can be dispersed on an inert finely divided solid and employed as a dust. Such mixtures may also be dispersed in water with or without the aid of surface active agent and the resulting aqueous suspension employed as sprays. In other procedures, the product is employed as an active constituent in solvent solutions, oil-in-water or water-in-oil emulsions or aqueous dispersions. In representative operations, finely divided solid compositions containing 600 parts per million by weight of m-(2-propynyloxy)phenyl benzoate gives 100 percent kills of mouse pinworms and mouse tapeworms.

I claim:
m(2-propynyloxy)phenyl benzoate.

No references cited.

LORRAINE A. WEINBERGER, Primary Examiner.
T. GALLOWAY, Assistant Examiner.